(12) United States Patent
Ito et al.

(10) Patent No.: US 7,770,658 B2
(45) Date of Patent: Aug. 10, 2010

(54) CONTROL METHOD AND CONTROL UNIT FOR IMPACT TYPE SCREW FASTENING DEVICE

(75) Inventors: Takaya Ito, Osaka (JP); Yoshitsugu Shibata, Saitama (JP); Hitoshi Takamura, Saitama (JP)

(73) Assignees: Estic Corporation, Osaka (JP); Honda Motor Co., Ltd., Tokyo (JP)

( * ) Notice: Subject to any disclaimer, the term of this patent is extended or adjusted under 35 U.S.C. 154(b) by 220 days.

(21) Appl. No.: 11/920,162

(22) PCT Filed: May 10, 2006

(86) PCT No.: PCT/JP2006/309415
§ 371 (c)(1),
(2), (4) Date: Feb. 11, 2008

(87) PCT Pub. No.: WO2006/121085
PCT Pub. Date: Nov. 16, 2006

(65) Prior Publication Data
US 2009/0014192 A1    Jan. 15, 2009

(30) Foreign Application Priority Data
May 12, 2005  (JP)  ............................. 2005-139565

(51) Int. Cl.
*B23B 23/14* (2006.01)
(52) U.S. Cl. ............................. 173/1; 173/2; 173/176; 173/181
(58) Field of Classification Search ............. 173/1, 173/2, 176, 179, 180, 181, 183; 73/862.23, 73/862.338; 318/432, 434, 811
See application file for complete search history.

(56) References Cited

U.S. PATENT DOCUMENTS

| | | | | |
|---|---|---|---|---|
| 3,975,954 | A * | 8/1976 | Barnich | 73/862.23 |
| 4,316,512 | A * | 2/1982 | Kibblewhite et al. | 173/183 |
| 5,366,026 | A * | 11/1994 | Maruyama et al. | 173/180 |
| 6,167,606 | B1 * | 1/2001 | Mueller et al. | 29/407.02 |
| 6,668,212 | B2 * | 12/2003 | Colangelo et al. | 700/275 |
| 6,680,595 | B2 * | 1/2004 | Ito | 318/434 |
| 6,836,614 | B2 * | 12/2004 | Gilmore | 388/811 |

(Continued)

FOREIGN PATENT DOCUMENTS

JP    58-171272 A    10/1983

(Continued)

*Primary Examiner*—Scott A. Smith
(74) *Attorney, Agent, or Firm*—Birch, Stewart, Kolasch & Birch, LLP

(57) ABSTRACT

An object is to improve accuracy of tightening torque and to shorten time necessary for fastening a screw in an impact type screw fastening device that uses an electric motor as a rotation driving source. A control method for the impact type screw fastening device that uses an electric motor as a rotation driving source includes the steps of driving the motor to rotate by supplying current to the motor intermittently so that torque exerted on a load by rotation of the motor becomes like pulses on the time axis, and controlling the current of every time of each pulse so that an increment of every time of each pulse of the torque after the torque reaches a target approach torque TQN that is a first set value becomes smaller than that before it reaches the target approach torque TQN.

17 Claims, 13 Drawing Sheets

U.S. PATENT DOCUMENTS

| | | | |
|---|---|---|---|
| 6,968,908 B2 * | 11/2005 | Tokunaga et al. | 173/181 |
| 6,978,846 B2 * | 12/2005 | Kawai et al. | 173/2 |
| 7,334,648 B2 * | 2/2008 | Arimura | 173/179 |

FOREIGN PATENT DOCUMENTS

| | | |
|---|---|---|
| JP | 59-219176 A | 12/1984 |
| JP | 5-131377 A | 5/1993 |
| JP | 8-1536 A | 1/1996 |
| JP | 2001-521448 A | 11/2001 |
| JP | 2004-322262 A | 11/2004 |
| WO | WO-98/47665 A1 | 10/1998 |

* cited by examiner

CONTROL METHOD AND CONTROL UNIT FOR IMPACT TYPE SCREW FASTENING DEVICE

TECHNICAL FIELD

The present invention relates to a control method and a control unit for an impact type screw fastening device. In particular, the present invention relates to a screw fastening device with reduced reaction force so as to be adapted to one-hand use.

BACKGROUND ART

Conventionally, a power screw fastening device is used for fastening a bolt or a screw with predetermined torque. The screw fastening device rotates its shaft continuously so as to fasten a screw and usually performs controlling of turning off the power or disengage a clutch when the torque becomes a certain value.

In various kinds of assembling lines, a worker often fastens a screw with respect to a work on a conveyor belt with a screw fastening device handled by hand.

In this case, it is desirable that the screw fastening device can be operated by one hand from the viewpoint of workability. A screw fastening device for one-hand requires the worker to receive reaction force of fastening a screw by one hand, so there is a problem of increase in the reaction force that is exerted on the worker as a load as the tightening torque increases.

A type of rotating the shaft continuously as described above puts a large load on the worker because the reaction force of the tightening torque is received directly by the worker's hand. In order to reduce this reaction force, an impact type that utilizes rotor inertia of a rotor is used.

However, since the conventional impact type screw fastening device fastens a screw via an impact energy generating mechanism and a socket, accuracy of the tightening torque varies largely when transmission efficiency of them varies. Therefore, it is not suitable for fastening a screw that requires high accuracy. In order to improve the accuracy, there is a method of providing a clutch mechanism to a distal end portion of the shaft so that the clutch is disengaged to control the torque when excessive torque is applied.

From this circumstance, a screw fastening device called an oil pulse wrench is widespread which combines two functions (an impact generating portion and a clutch mechanism) for two tasks of reducing the reaction force and improving the accuracy.

The oil pulse wrench is usually equipped with an oil pulse portion including an air motor that is a driving source and a bypass valve that generates an impulse and can use its oil pressure as a clutch mechanism, which are integrated.

However, the oil pulse wrench has various problems as follows. First, it is troublesome to adjust oil pressure of the bypass valve that works as the clutch mechanism. As the oil pulse generating portion is deteriorated, readjustment and replacement of components should be performed frequently. Accuracy of tightening torque varies depending on oil temperature. Since heat generation by the oil pulse portion is large, countermeasures should be required.

As a device that solves the problems of the conventional oil pulse wrench, a screw fastening device using an electric motor is proposed (see Japanese unexamined patent publication No. 2002-1676.)

DISCLOSURE OF THE INVENTION

According to the conventional screw fastening device described above, current is supplied to the motor intermittently so that the motor generates pulse torque. Thus, good accuracy can be obtained despite a small reaction force that is exerted on the worker, and the worker can perform the screw fastening work by one hand.

However, the inventors have studied for improvement of accuracy of the tightening torque and reduction of time necessary for screw fastening in the screw fastening work so as to improve the screw fastening device described above.

Therefore, an object of the present invention is to improve accuracy of the tightening torque and reduce time necessary for screw fastening in the impact type screw fastening device having an electric motor as a rotation driving source.

A control method according to an aspect of the present invention is a control method for an impact type screw fastening device that uses an electric motor as a rotation driving source. The control method includes the steps of driving the motor to rotate by supplying current to the motor intermittently so that torque exerted on a load by rotation of the motor becomes like pulses on the time axis, and controlling the current of every time of each pulse so that an increment of every time of each pulse of the torque after the torque reaches a first set value becomes smaller than that before it reaches the first set value.

Preferably, current to be supplied to the motor may be increased every time of each pulse in a first stage before the torque exerted on a load by rotation of the motor reaches the first set value, and an increment of every time of each pulse of the current to be supplied to the motor in a second stage after the torque reaches the first set value is set to a smaller value than that in the first stage.

In addition, when the torque reaches the first set value, a value of the current of every time of each pulse to be supplied to the motor may be decreased.

In addition, current may be supplied to the motor so that a current value of every time of each pulse alters in a first slope in the first stage before the torque exerted on a load by rotation of the motor reaches the first set value, and current may be supplied to the motor so that a value of the current of every time of each pulse to be supplied to the motor is decreased first and then a current value of every time of each pulse alters in a second slope in the second stage after the torque exerted on a load by rotation of the motor reaches the first set value.

Preferably, an angle of inclination of the second slope may be set to a value smaller than that of the first slope. Alternatively, an angle of inclination of the first slope is set to zero.

In addition, supply of current to the motor may be stopped when the torque exerted on a load by rotation of the motor reaches a second set value.

A control unit according to another aspect of the present invention is a control unit for an impact type screw fastening device that uses an electric motor as a rotation driving source. The control unit includes a pulse driving portion that drives and controls the motor to rotate by supplying current to the motor intermittently so that torque exerted on a load by rotation of the motor becomes like pulses on the time axis, and a pulse control portion that controls the current of every time of each pulse so that an increment of every time of each pulse of the torque after the torque reaches a first set value becomes smaller than that before it reaches the first set value.

In addition, the control unit may include a torque detecting portion that detects tightening torque of a screw by the motor, a setting portion that sets a first set value and a second set value with respect to the tightening torque, a pulse driving portion that drives and controls the motor to rotate by supplying current to the motor intermittently so that the tightening torque is generated in a pulse-like manner on the time axis, a pulse control portion that controls the current of every time of each pulse so that an increment of every time of each pulse of the tightening torque after the tightening torque reaches the first set value becomes smaller than that before it reaches the first set value, and a stop control portion stops supply of current to the motor when the tightening torque reaches the second set value.

A screw fastening device according to yet another aspect of the present invention includes a screw fastening device main body that uses an electric motor as a rotation driving source, a torque detecting portion that detects tightening torque of a screw by the motor, a setting portion that sets a first set value and a second set value with respect to the tightening torque, a pulse driving portion that drives and controls the motor to rotate by supplying current to the motor intermittently so that the tightening torque is generated in a pulse-like manner on the time axis, a pulse control portion that controls the current of every time of each pulse so that an increment of every time of each pulse of the tightening torque after the tightening torque reaches the first set value becomes smaller than that before it reaches the first set value, and a stop control portion that stops supply of current to the motor when the tightening torque reaches the second set value.

BEST MODE FOR CARRYING OUT THE INVENTION

First Embodiment

Figure 1:
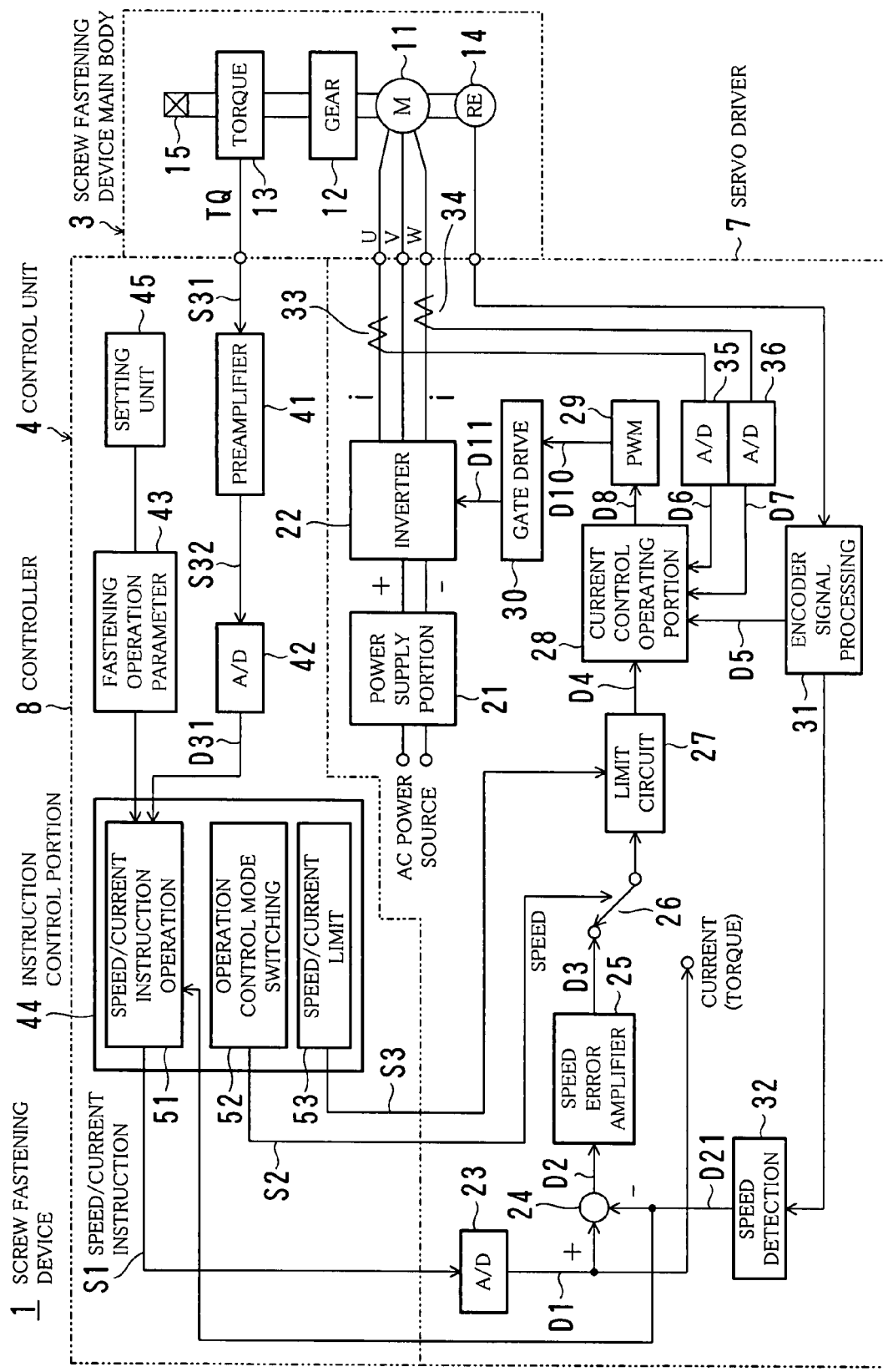
FIG. 1 is a block diagram showing a general structure of a screw fastening device according to an embodiment of the present invention.

FIG. 1 is a block diagram showing a general structure of a screw fastening device 1 according to a first embodiment of the present invention.

In FIG. 1, the screw fastening device 1 includes a screw fastening device main body 3 and a control unit 4 having a servo driver 7 and a controller 8.

The screw fastening device main body 3 includes a motor 11, an impact generating unit 12, a torque sensor 13, an encoder 14, an output shaft 15, a casing (not shown), and a switch (not shown).

As the motor 11, a three-phase AC servo motor is used, for example. The impact generating unit 12 is an impact energy generating mechanism that converts rotation force of the motor 11 into intermittent impact force. Although various mechanisms can be used as the impact generating unit 12, a reduction gear including a planet gear and the like is used in the present embodiment. Backlash (play) of the planet gear and play of a joint portion or the like are used for generating impact. More specifically, while a high speed side such as a planet gear rotates several revolutions, a gear of a low speed side rotates corresponding to the play, so that impact is generated when engaging gears actually contact each other on the low speed side. Inertia force accumulated while the high speed side is rotating becomes large impact. As the impact generating unit 12, other mechanisms can be used, which include a two-hammer mechanism, a swing hammer mechanism, other hammer mechanism, an oil pulse mechanism and the like. If the two-hammer mechanism is used, two impacts are generated during one revolution of the motor 11. If the swing hammer mechanism is used, one impact is generated during one revolution of the motor 11 so that one impact has a large output power. These impact generating units 12 are known.

The torque sensor 13 detects tightening torque TQ of a screw by the motor 11 and delivers a detection signal S31. In the present embodiment, it directly detects torque generated on the output shaft 15, i.e., torque (tightening torque) that fastens a screw as a load among torque delivered from the motor 11. Therefore, the detection signal S31 obtained from the torque sensor 13 indicates a waveform of real tightening torque TQ that is applied to the screw by the impact generated by the impact generating unit 12.

The encoder 14 is provided for detecting rotational speed of the motor 11 and delivers a pulse signal including pulses of the number proportional to the number of revolutions of the motor 11.

The screw fastening device main body 3 has a handle grip portion gripped by a user with one hand, and it is covered as a whole with a casing having a shape that enables the user to operate it by one hand. When a switch (not shown) is operated, power is controlled to be turned on and off.

The servo driver 7 includes a power supply portion 21, an inverter 22, an AD converter 23, an adder 24, a speed error amplifier 25, a changeover switch 26, a limit circuit 27, a current control operating portion 28, a PWM circuit 29, a gate drive 30, an encoder signal processing portion 31, a speed detecting portion 32, current detectors 33 and 34, and AD converters 35 and 36.

The controller 8 includes a preamplifier 41, an AD converter 42, a parameter storing portion 43, and an instruction control portion 44. The instruction control portion 44 is equipped with a speed/current instruction operating portion 51, an operation control mode switching portion 52, a speed/current limiting portion 53 and the like.

The power supply portion 21 rectifies alternating electric power of AC 100 volts for example and converts it into DC electric power of appropriate various voltages. The DC electric power is supplied to the inverter 22, other circuits and individual portions.

The AD converter 23 receives the speed/current instruction (speed/torque instruction) S1 delivered from the speed/current instruction operating portion 51 and delivers instruction data D1 having a digital value corresponding to it. The instruction data D1 becomes speed instruction data D1S or current (torque) instruction data D1T in accordance with an operating mode.

The adder 24 subtracts speed data D21 delivered by the speed detecting portion 32 from the instruction data D1 delivered by the AD converter 23.

The speed error amplifier 25 amplifies the speed instruction data D2 delivered from the adder 24 in a differential manner.

The changeover switch 26 switches between the speed instruction data D3 delivered by the speed error amplifier 25 and the current instruction data D1T delivered by the AD converter 23 in accordance with a control switch instruction S2 from the operation control mode switching portion 52. More specifically, it is connected to the speed instruction data D3 delivered by the speed error amplifier 25 when speed control is performed, while it is connected to the current instruction data D1T delivered by the AD converter 23 when current control (torque control) is performed.

The limit circuit 27 performs controlling of limiting a maximum value of the rotational speed or the current of the motor 11 based on a speed/current limit instruction (speed/torque limit instruction) S3 from the speed/current limiting portion 53.

The current control operating portion 28 calculates a value of current to be flown in the motor 11 based on the instruction data D4 delivered by the limit circuit 27, data D5 delivered by the encoder signal processing portion 31 and current data D6 and D7 delivered by the AD converters 35 and 36, and it delivers a result of the calculation as current instruction data D8.

The PWM circuit 29 performs PWM (pulse width modulation) based on the current instruction data D8 delivered by the current control operating portion 28 and delivers a pulse signal D10 after the pulse width modulation.

The gate drive 30 generates a pulse signal D11 for turning on and off the gate of each switching element of the inverter 22 based on the pulse signal D10.

The encoder signal processing portion 31 performs signal processing of the pulse signal delivered from the encoder 14.

The speed detecting portion 32 detects speed based on a signal delivered from the encoder signal processing portion 31 and delivers speed data D21 indicating a value corresponding to the speed. Therefore, the speed data D21 indicates a real rotational speed of the motor 11.

The current detectors 33 and 34 detect current (motor current) i of the u-phase and the w-phase that flow in the motor 11. The AD converters 35 and 36 convert the motor current i detected by the current detectors 33 and 34 into current data D6 and D7 of digital values, respectively.

The preamplifier 41 amplifies the detection signal S31 detected by the torque sensor 13. The AD converter 42 converts a signal S32 delivered by the preamplifier 41 into torque data D31 of a digital value and delivers it to the speed/current instruction operating portion 51. The torque data D31 is data indicating real tightening torque TQ for a screw as described above.

The parameter storing portion 43 stores various kinds of parameters necessary for calculation in the speed/current instruction operating portion 51 and the like. The parameters include a minimum current value, measurement start torque, seating torque TS, target approach torque TQN, target torque TQJ, a maximum value TQM of the tightening torque TQ, a current slope θ, a first slope θ1, and a second slope θ2, for example. These parameters are set by a setting unit 45. As the setting unit 45, a digital switch, a ten key, a touch panel, a changeover switch or the like is used.

Note that the target approach torque TQN is also referred to as change torque and corresponds to a first set value of the present invention. The target torque TQJ corresponds to a second set value of the present invention. The first slope θ1 and the second slope θ2 correspond to an angle of inclination with respect to a time axis of the current instruction data D1T due to current increment in a first stage and a second stage in the present invention, respectively. In the present embodiment, the second slope θ2 is more gradual than the first slope θ1 is.

The speed/current instruction operating portion 51 calculates a speed instruction value and a current value for instruction based on the torque data D31 from the AD converter 42, the parameter from the parameter storing portion 43, and the like, and it delivers them as a speed/current (torque) instruction S1.

Note that a current instruction S1T of the speed/current (torque) instruction S1 delivers a current value for instruction only during an on-period TN of a current pulse DP that will be described later, and the current instruction S1T is set zero during an off-period TF thereof.

The operation control mode switching portion 52 switches between a speed control mode and a current control (torque control) mode.

In the speed control mode, the control is performed so that the rotational speed of the motor 11 becomes speed set by the speed instruction data D1S. The current flowing in the motor 11 is controlled to be the set speed even if a load thereof varies. A limit value of the current can be set in the speed control mode. A maximum value of current is restricted by the limit value of current. Therefore, there is a case where the set speed cannot be reached depending on a state of load.

In the current control mode, the control is performed so that the current flowing in the motor 11 becomes a current value set by the current instruction data D1T. The rotational speed of the motor 11 alters in accordance with the set current value and a state of load. In the current control mode, a limit value of rotational speed can be set. When the rotational speed of the motor 11 reaches the limit value, the current value is restricted.

The changeover switch 26 selects the speed instruction data D3 in the speed control mode while it selects the current instruction data D1T in the current control mode.

In the fastening operation during automatic operation, the operation is first performed in the speed control mode, so that the output shaft 15 rotates at high speed. When the tightening torque TQ generated in the output shaft 15 reaches the preset seating torque TS, it is determined that a screw as the load is seated, and the mode is switched to the current control mode. In the current control mode, the current flowing in the motor 11 is controlled so that output torque indicated by the current instruction data D1T can be obtained.

During manual operation, either one of the modes is set responding to an operation of a changeover switch (not shown).

The speed/current limiting portion 53 sets maximum values of speed and current (torque), and it supplies the set values to the limit circuit 27.

The controller 8 is constituted by using a CPU, a ROM, a RAM, other peripheral elements and the like. The speed/current instruction operating portion 51, the operation control mode switching portion 52, the speed/current limiting portion 53 and the like are realized when a program stored in the ROM is executed by the CPU. It is possible to realize a part of them by using a hardware circuit.

The controller 8 is equipped with an input device for entering data or instructions, a display device for displaying a good or bad result of fastening, a communication device for communication with other data processing system or a control unit.

Next, a principle of the control method in the present embodiment will be described with reference to FIG. 9 that will be described later.

First, control for reducing reaction force of the tightening torque TQ (control without reaction force) will be described.

The screw fastening device main body 3 is operated by a worker who grips its handle grip portion by one hand. In order to reduce reaction force that is exerted on the worker, the motor 11 is operated not in a continuous manner in which current flows continuously but in an intermittent manner in which pulse current flows.

Figure 9:
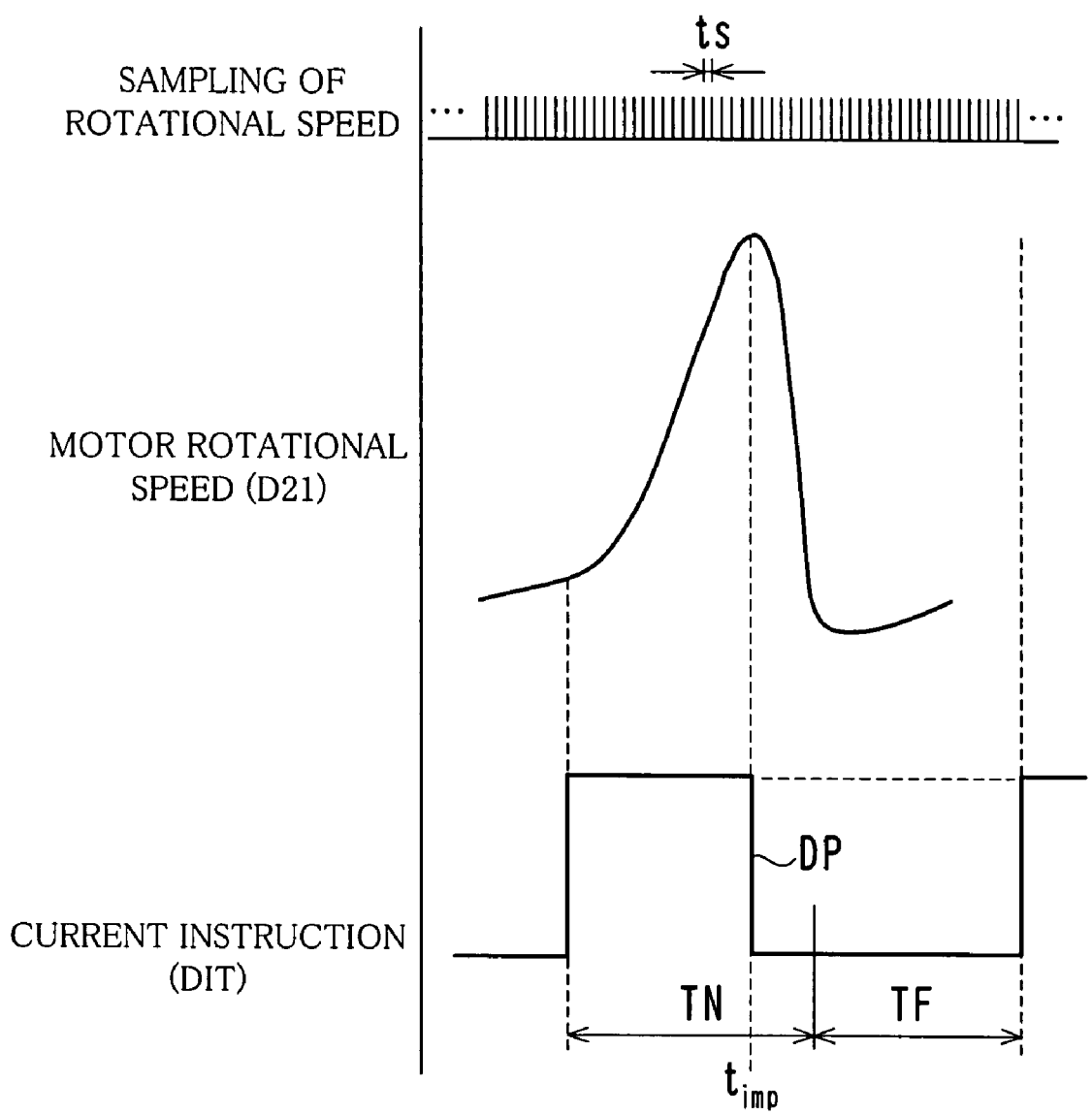
FIG. 9 is a diagram showing control of the current pulse in detail.

More specifically, as shown in FIG. 9, pulse-like current (current pulse DP) is supplied to the motor 11 intermittently based on the instruction data D1 (current instruction data D1T). The current pulse DP has variable on-period TN and off-period TF and is repeated at a predetermined period that is a total sum of the on-period TN and the off-period TF. As for the height of the current pulse DP, torque two-stage control is performed as described later.

In FIG. 9, the motor 11 starts to rotate when the a current pulse DP becomes on, and the rotational speed increases gradually. When the motor 11 rotates by a predetermined angle or a predetermined number of revolutions, a rotating input side member collides with an output side member in the impact generating unit 12. Thus, an impact is generated. In other words, an inertial energy of the input side member in the impact generating unit 12 is transmitted to the output side member as an impact force when they collide with each other, and the impact force generates large torque. This torque acts as the tightening torque TQ to the screw as the load. During a short time period, i.e., approximately 0.01-0.005 seconds from the instant of impact tow, most of the inertial energy of the input side member is transmitted to the output side member and to the screw. Thus, the rotational speed of the motor 11 decreases to almost zero. After that, the motor 11 restarts to rotate so that inertial energy is accumulated for the next impact.

In the present embodiment, the current flowing in the motor 11 is stopped at the instant of impact tab or a micro width before or after that instant in particular after the same. In other words, supply of electric power to the motor 11 is stopped. As the timing for stopping the current, timing when the rotational speed of the motor 11 becomes maximum can be adopted. For example, timing is detected when the rotational speed of the motor 11 switches from an increase to a decrease. As a method for the detection, for example, the rotational speed is sampled at constant short time interval ts, and it is detected that the sampled value becomes smaller than the previous sampled value as the timing when the rotational speed becomes maximum. Actually, in order to prevent a detection error due to noise or the like, it is detected that the rotational speed becomes maximum when the sampled value becomes smaller than the previous sampled value a plurality of times (e.g., three times) continuously. The current instruction data D1T is generated so that the current pulse DP becomes off at the timing detected as described above. Note that the time interval ts is set to a value of 0.5 milliseconds, for example.

In this way, since supply of electric power to the motor 11 is stopped when the rotational speed of the motor 11 becomes maximum, wasteful generation of tightening torque after generating impact can be avoided. Thus, the reaction force that is exerted on the worker becomes approximately transient torque only generated by the motor 11 at the instant of impact to. Therefore, reaction force that is exerted on the worker is reduced largely.

If the current is supplied to the motor 11 continuously after the generation of impact until the on-period TN passes, the current generates torque that is exerted on the worker as the reaction force. This reaction force, i.e., torque generated by the current hardly contributes to fastening of the screw. According to the control of the present embodiment, this wasteful tightening torque TQ can be almost zero, so that reaction force that is exerted on the worker can be reduced largely.

In the present embodiment, such a current pulse DP is generated every time for each pulse. In other words, the drive control is performed so that the current supplied to the motor 11 is increased every time for each pulse and that the torque generated by the motor 11 is increased every time for each pulse. Then, the period until the tightening torque TQ reaches the target approach torque TQN is referred to as the first stage, and the period from when the tightening torque TQ reaches the target approach torque TQN until it reaches the target torque TQJ is referred to as a second stage. The increment of the current pulse D, i.e., increment of current to be supplied to the motor 11 is set to a large value in the first stage, while it is set to a small value in the second stage. In other words, the increment of the current pulse D in the second stage is set to a value smaller than that in the first stage. This torque two-stage control will be described in more detail below.

Next, a control method of the screw fastening device 1 will be described with reference to flowcharts showing procedures and operations of a fastening step and a diagram showing an operational state.

Figure 2:
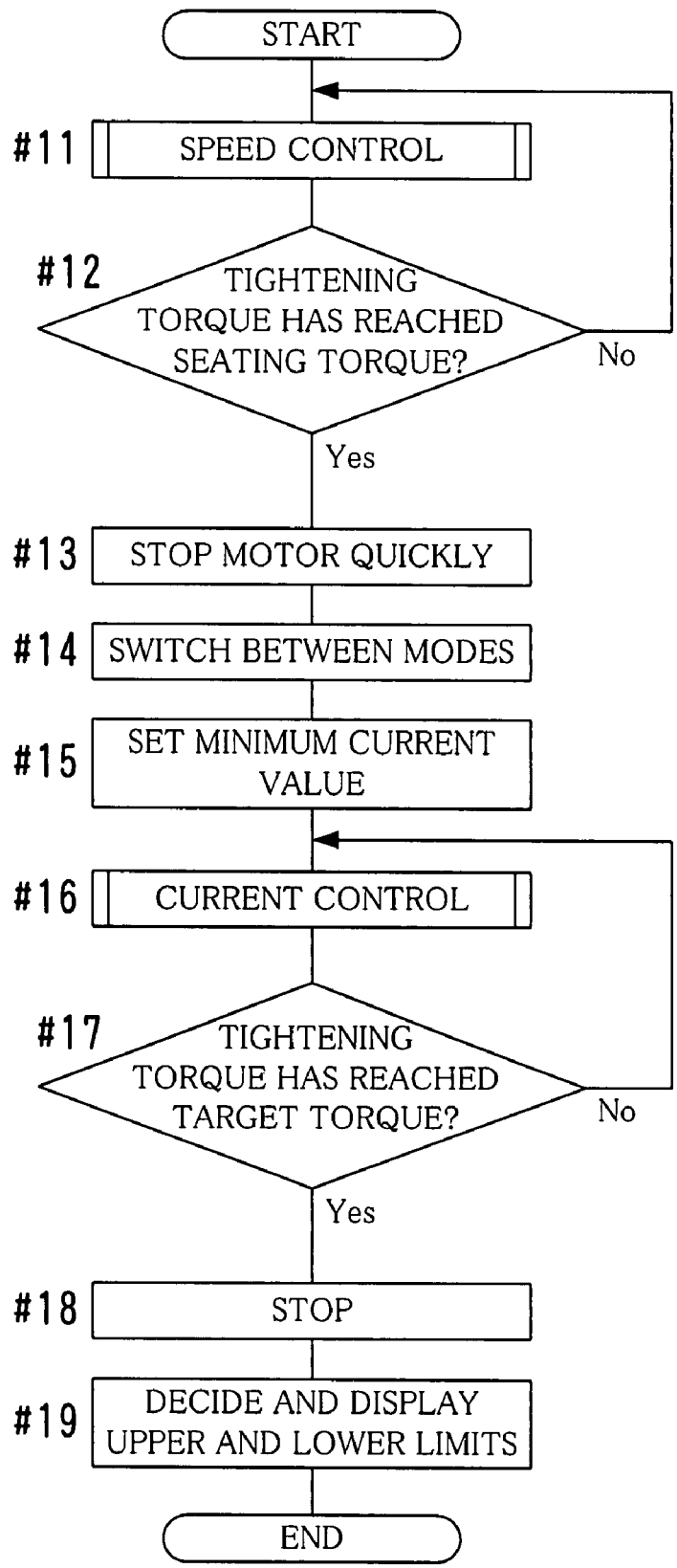
FIG. 2 is a flowchart showing a procedure of fastening operation of the screw fastening device.
Figure 3:
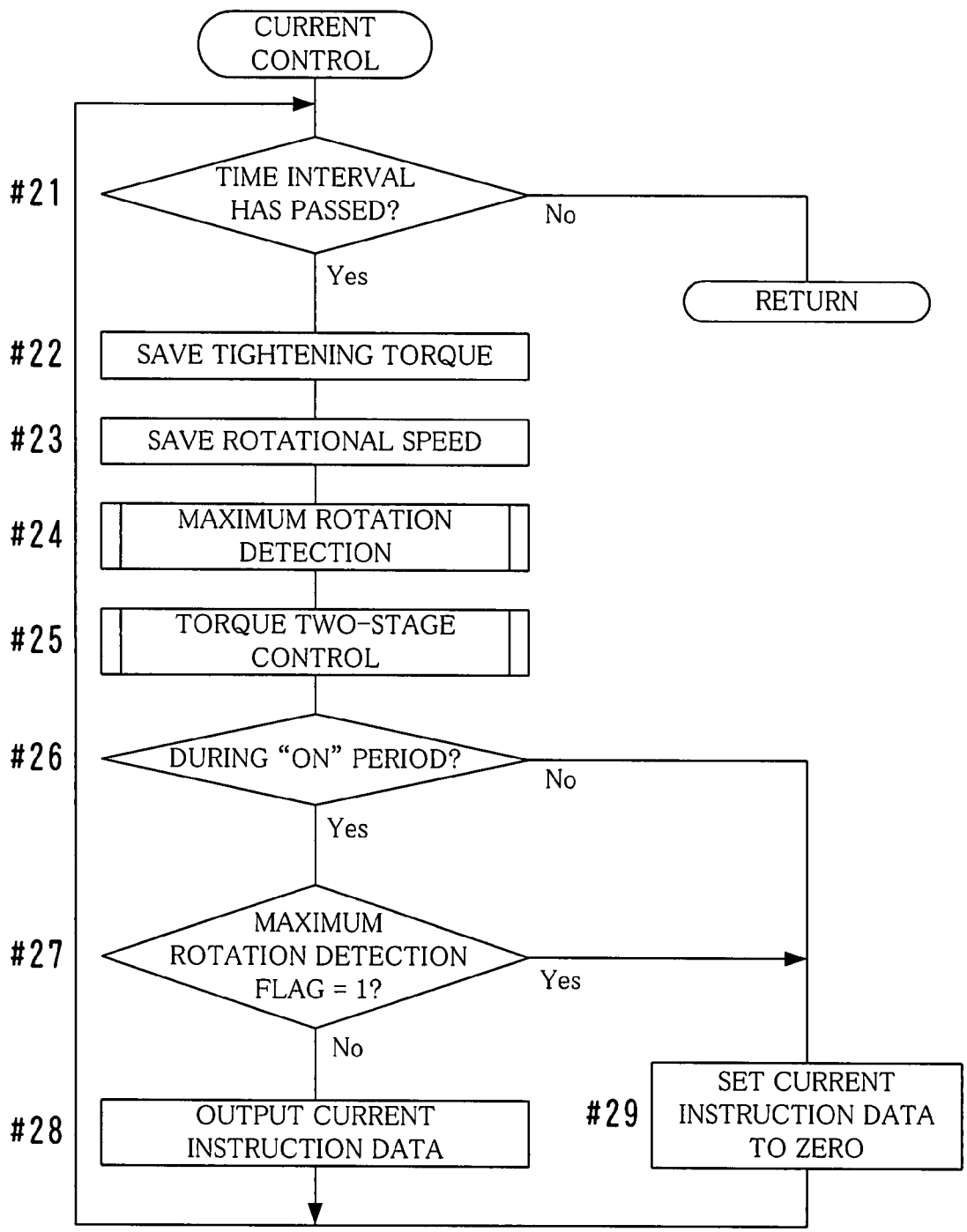
FIG. 3 is a flowchart showing a routine of a current control.
Figure 4:
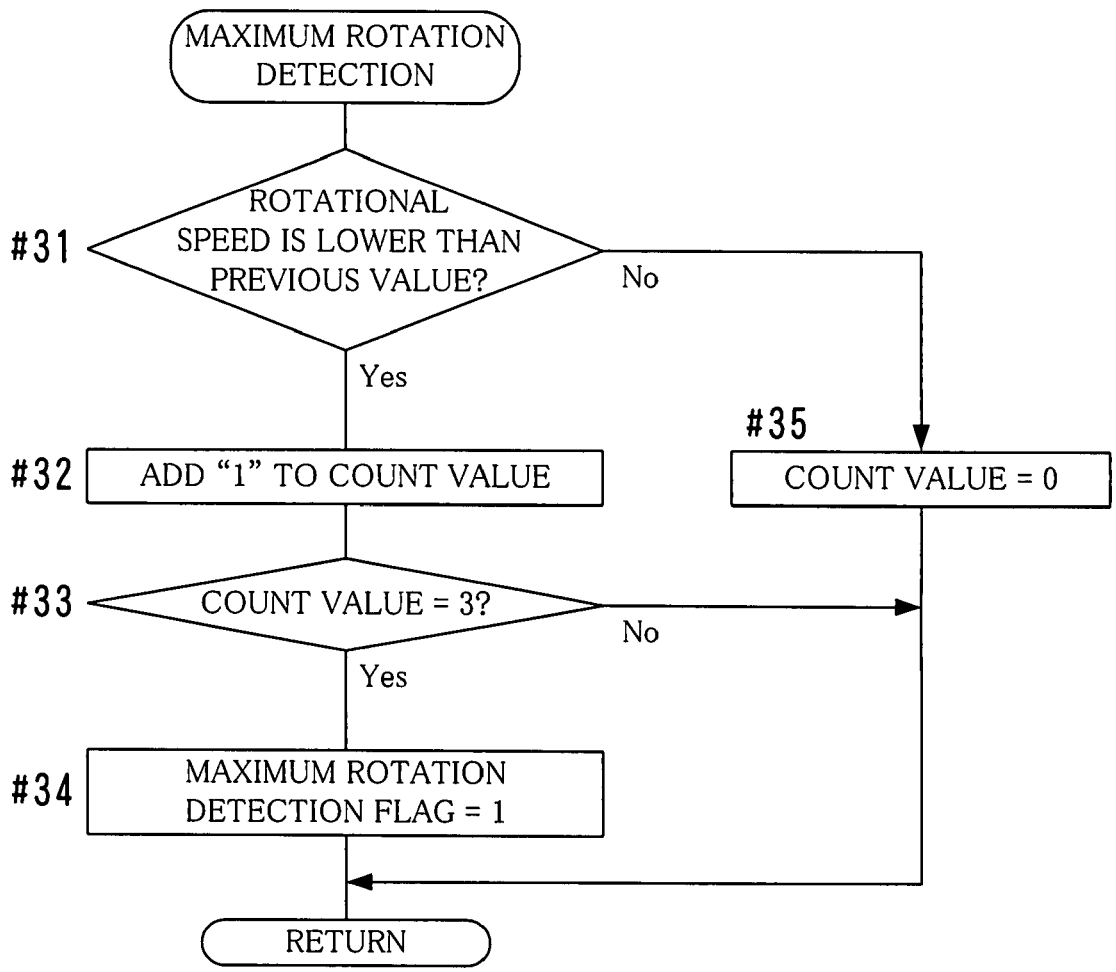
FIG. 4 is a flowchart showing a routine of a maximum rotation detection process.
Figure 5:
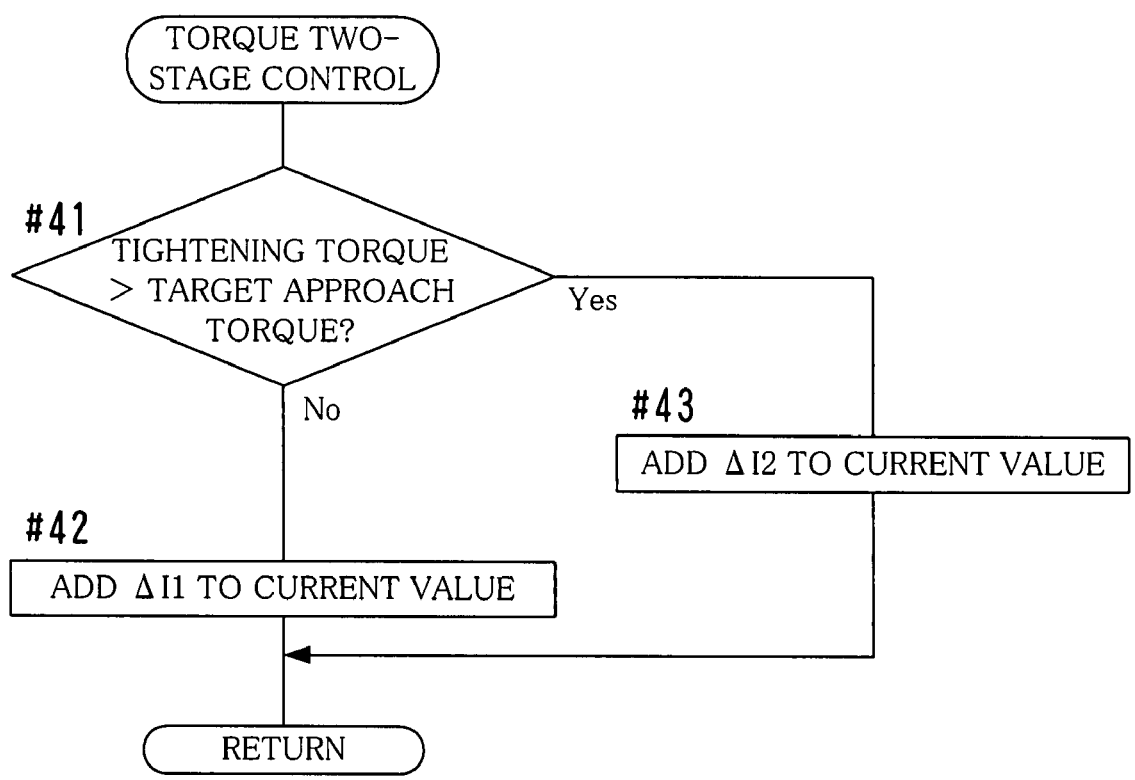
FIG. 5 is a flowchart showing a routine of a torque two-stage control process.
Figure 6:
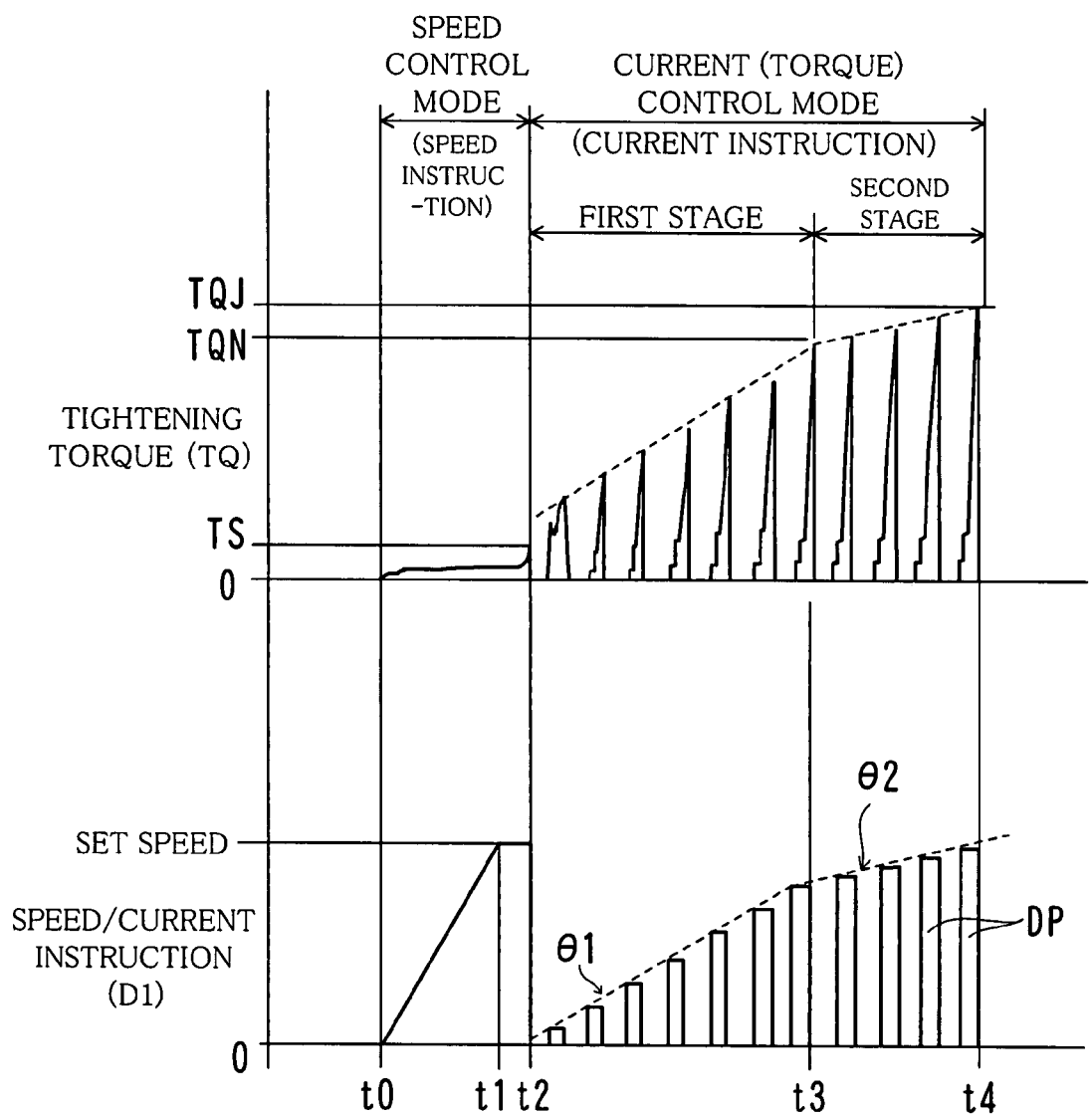
FIG. 6 is a diagram showing a general state of the screw fastening operation by the screw fastening device.
Figure 7:
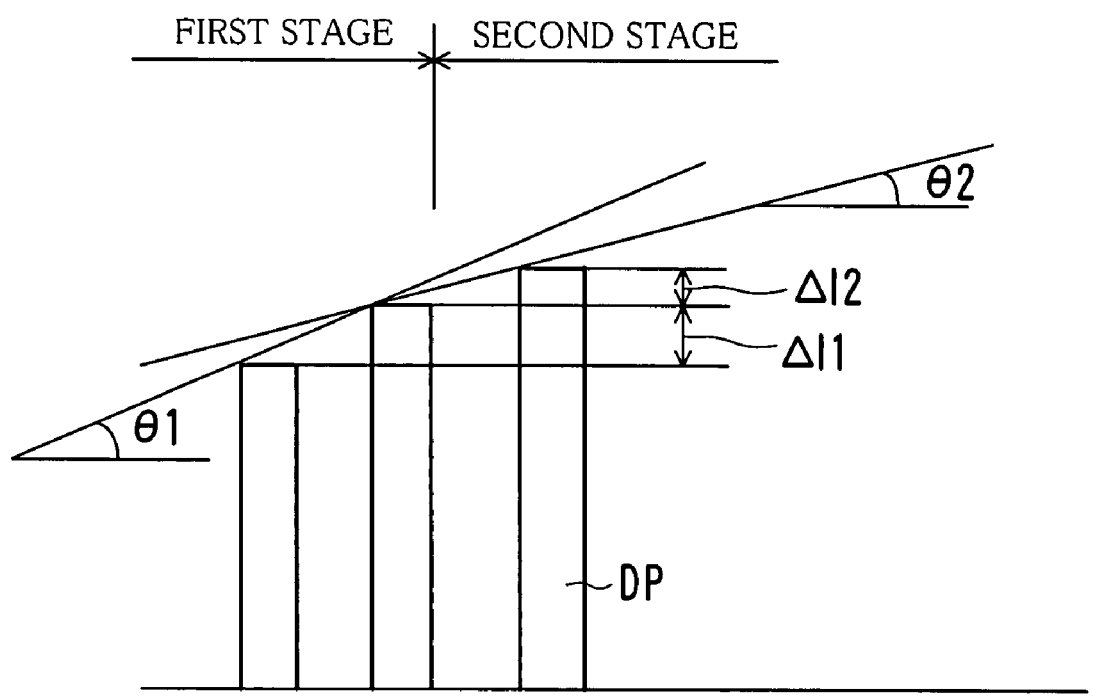
FIG. 7 is a diagram showing a variation state of increment of a current pulse in an enlarged manner.
Figure 8:
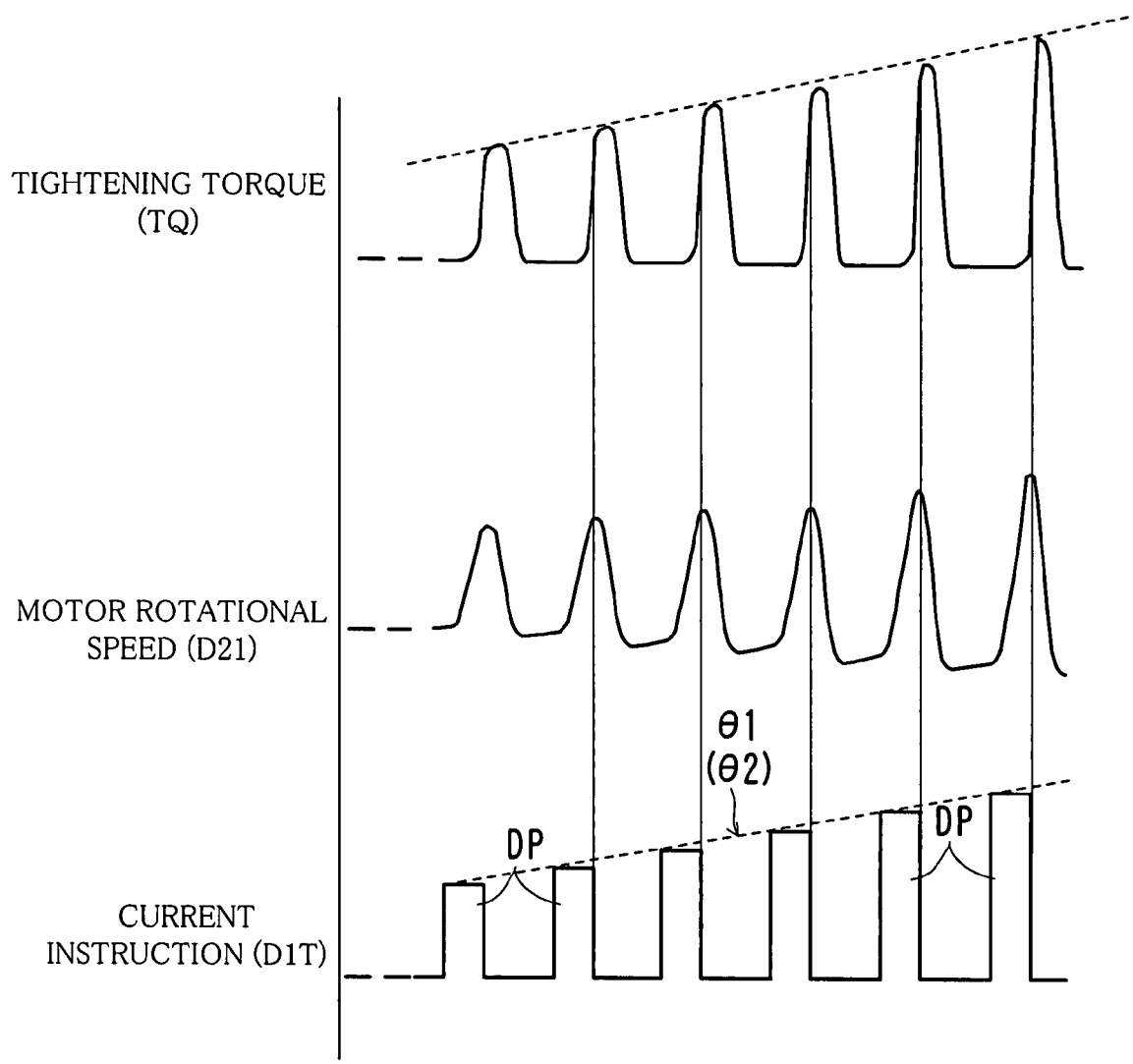
FIG. 8 is a diagram showing a relationship between rotational speed of a motor and current instruction data.

FIG. 2 is a flowchart showing a procedure of fastening operation of the screw fastening device 1, FIG. 3 is a flowchart showing a routine of a current control, FIG. 4 is a flowchart showing a routine of a maximum rotation detection process, FIG. 5 is a flowchart showing a routine of a torque two-stage control process, FIG. 6 is a diagram showing a general state of the screw fastening operation by the screw fastening device 1, FIG. 7 is a diagram showing a variation state of increment of the current pulse DP in an enlarged manner, FIG. 8 is a diagram showing a relationship between rotational speed of the motor 11 and the current instruction data D1T, and FIG. 9 is a diagram showing control of the current pulse DP in detail.

As shown in FIG. 6, the fastening operation includes operations in the speed control mode during a time period t0-t2 and in the current control mode during a time period t2-t4.

In FIG. 2, speed control in the speed control mode is performed first (#11). In the speed control, the rotational speed of the motor 11 is set by the speed instruction data D1S. The speed instruction value is increased gradually, so that the rotational speed of the motor 11 is also increased. When it becomes predetermined rotational speed, it is maintained at a constant value. Thus, the motor 11 rotates at high speed, and the screw is fastened temporarily until it is seated. If the tightening torque TQ exceeds measurement start torque during that period, measurement is started.

When the tightening torque TQ reaches the seating torque TS (Yes in #12), it is decided that the screw is seated, and the motor 11 is stopped quickly (#13).

In order to stop the motor 11 quickly, the speed instruction value of the motor 11 is set to zero, and current to lock the motor 11 is supplied so as to brake. Then, the operation mode is switched to the current control mode (#14).

In the current control mode, a minimum current value ST1 that is necessary for idling of the motor 11 is set as the current instruction data D1T first (#15).

Then, the current control is performed (#16) until the tightening torque TQ reaches the target torque TQJ (No in #17).

When the tightening torque TQ reaches the target torque TQJ (Yes in #17), the motor 11 is stopped (#18). In order to stop the motor 11, the supply of the current pulse DP is stopped so that current flowing in the motor 11 becomes zero.

Then, it is decided whether or not the final tightening torque TQ and the maximum value TQM that has appeared until then are within the range between the set upper and lower limit values, and a result of the decision is displayed on a screen of the display device (#19).

In the current control, current flowing in the motor 11 is set by the current instruction data D1T. In accordance with a level of current flowing in the motor 11, start up of the motor 11, i.e., the rotational speed is decided, and magnitude of the tightening torque TQ due to the impact is decided in accordance with it.

In FIG. 3, a process after the step #22 is performed every time when the time interval ts passes (Yes in #21). More specifically, every time when the time interval ts passes, the tightening torque TQ and the rotational speed (speed data D21) are measured first, and the measured values are saved (#22 and 23).

Next, the maximum rotation detection process is performed (#24), and the torque two-stage control is performed (#25).

If it is during the on-period TN (Yes in #26), and if a maximum rotation detection flag that will be described later is not "1" (No in #27), an appropriate current value that is calculated to be supplied to the motor 11 is delivered as the current instruction data D1T (#28). If it is during the off-period TF (No in #26), or if the maximum rotation detection flag is "1" (Yes in #27), the current instruction data D1T is set to zero (#29).

Note that a value of the current instruction data D1T is not the same as an actual value of current flowing in the motor 11 because of electromagnetic effect of the motor 11 and transient phenomenon.

In FIG. 4, the timing when the rotational speed of the motor 11 becomes maximum is detected in the maximum rotation detection process. More specifically, when the sampled value becomes lower than the previous sampled value (Yes in #31), "1" is added to the count value of the counter (#32). When the count value becomes "3" (Yes in #33), the maximum rotation detection flag is set to "1" (#34). If the sampled value is not smaller than the previous value in the step #31 (No in #31), the count value is reset to "0" (#35).

According to this process, if the maximum rotation detection flag is "1", the step #27 in FIG. 3 becomes "yes", and the current instruction data D1T, i.e., the current pulse DP becomes off.

In other words, as shown in FIG. 8, the control is performed with respect to each current pulse DP so that when the rotational speed of the motor 11 becomes the maximum, the current pulse DP is turned off.

Since it is detected that the rotational speed has become maximum when the sampled value becomes smaller than the previous value a plurality of times (three times, here) continuously, detection error due to noise can be prevented.

In FIG. 5, as for the torque two-stage control, if the tightening torque TQ has not reached the target approach torque TQN (No in #41), an increment ΔI1 is added to the current value (#42). If the tightening torque TQ has reached the target approach torque TQN (Yes in #41), an increment ΔI2 is added to the current value (#43). Note that the increment ΔI2 is a value smaller than the increment ΔI1.

In other words, as shown in FIG. 6, the control is performed in the current control mode so that current supplied to the motor 11 increases every time of generation of the current pulse DP. The time period until the tightening torque TQ reaches the target approach torque TQN is the first stage, and that after reaching the target approach torque TQN is the second stage.

As shown well in FIG. 7, the increment ΔI1 of the current pulse DP in the first stage is larger than the increment ΔI2 of the current pulse DP in the second stage. The increment ΔI1 of the current pulse DP in the first stage is calculated based on the first slope θ1 set by the user. In addition, the increment ΔI2 of the current pulse DP in the second stage is calculated based on the second slope θ2 set by the user.

Note that various methods can be used as the method of setting by the user. For example, the following methods can be used.

(1) Input θ1 and θ2 directly.

(2) Input ΔI1 and ΔI2 directly.

(3) Input θ1 or ΔI1 directly and input a ratio of θ2 or ΔI2 to θ1 or ΔI1.

(4) Input time necessary for the first stage or the second stage.

(5) Input a ratio of the first stage or the second stage to a reference time period.

In any case, if the first slope θ1 is set to an appropriate large value, the time period necessary for fastening the screw can be reduced. Then, if the second slope θ2 is decreased, the increment ΔI1 of current per one time can be decreased so that accuracy of tightening torque can be improved.

Note that such calculation of the torque two-stage control is performed by the speed/current instruction operating portion 51. In other words, the control is performed so that the current is increased every time of the pulse by the current instruction S1 delivered from the speed/current instruction operating portion 51. In the above description, the current pulse DP can be considered to be a signal waveform of the current instruction S1 delivered from the speed/current instruction operating portion 51. If the current pulse DP is considered to be the current instruction data D1T delivered from the AD converter 23 or the current instruction data D8 delivered from the current control operating portion 28, the height of the current pulse DP can be considered to indicate magnitude of the data value schematically.

In addition, the target approach torque TQN is set to a value smaller than the target torque TQJ and close to the target torque TQJ. Setting of the target approach torque TQN can be performed by supplying a ratio to the target torque TQJ or the target approach torque TQN itself, for example. For example, the target approach torque TQN is set to approximately 80 percent of the target torque TQJ.

As described above, since the current control is performed, wasteful generation of the tightening torque after the impact can be avoided. As a result, the reaction force that is exerted on the worker is reduced largely. In this way, even if the tightening torque TQ is large, it is possible to grip the screw fastening device main body 3 by one hand for use. Then, since the torque two-stage control is performed, accuracy of the tightening torque can be improved, and time necessary for fastening a screw can be shortened.

In addition, target torque TQJ, accuracy of fastening, time necessary for fastening a screw, a degree of reaction force and the like can be controlled easily by changing the parameter. In addition, since consumable parts such as the oil pulse portion, the clutch mechanism and the like that are used in the conventional device are not necessary, maintenance is easy so that stability of the system can be maintained for a long period.

Since the control is performed by using the electric motor 11, energy efficiency is high so that substantial energy saving and clean mechanism without dust mist can be realized compared with the conventional oil pulse wrench that tends to be required to have an air motor as an essential condition.

Accuracy of fastening, time necessary for fastening a screw, and a state of reaction force can be set to an optimal state by changing the on-period TN and/or the off-period TF in accordance with a type or a state of the load.

Second Embodiment

Next, a second embodiment of the present invention will be described.

In the first embodiment described above, the increment ΔI2 of the current pulse DP in the second stage is set to a smaller value than the increment ΔI1 of the current pulse DP in the first stage. Thus, the increment ΔI2 of the current pulse DP is controlled so that the increment at every time of each pulse of the tightening torque TQ after the tightening torque TQ reaches the target approach torque TQN that is the first set value becomes smaller than that before reaching the target approach torque TQN.

In contrast, the second embodiment makes the current value of every time of each pulse that is supplied to the motor 11 small when the tightening torque TQ reaches the target approach torque TQN. Other functions and structures are the same in many parts as the first embodiment, so description of the same parts as the first embodiment is omitted or simplified, and only the points different from the first embodiment will be described as follows. It is similar for the third embodiment.

Figure 10:
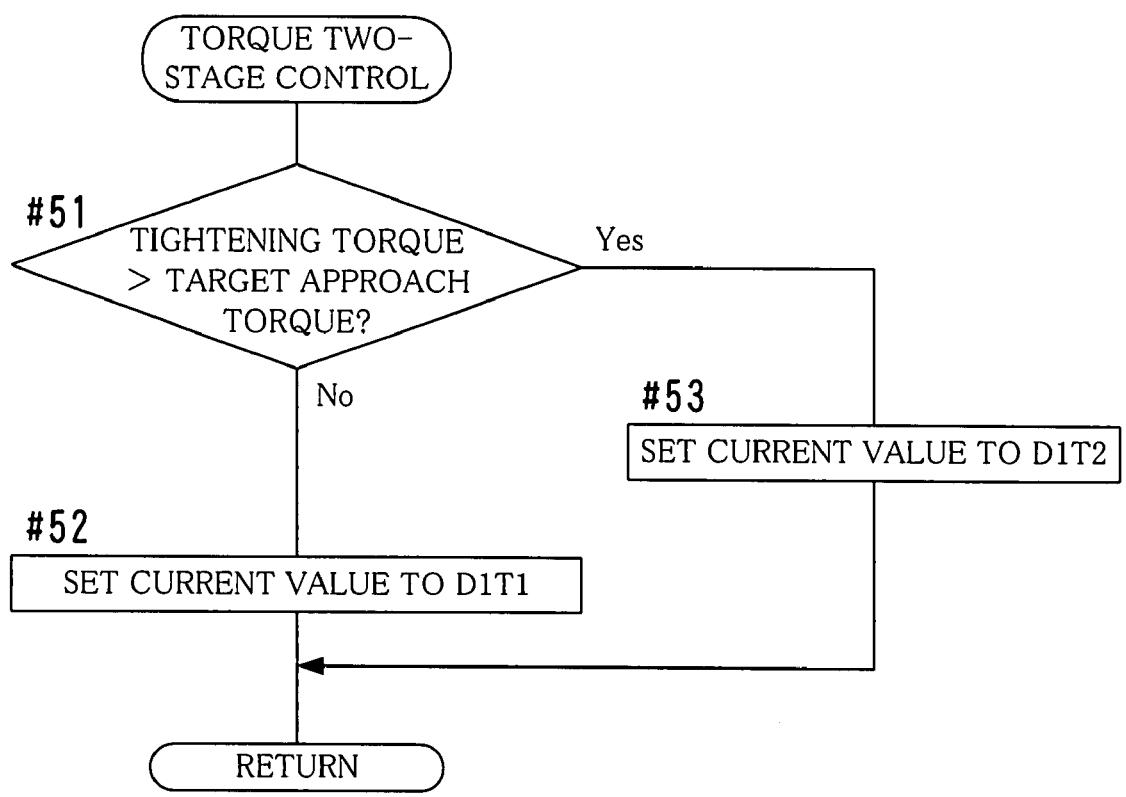
FIG. 10 is a flowchart showing the torque two-stage control process according to a second embodiment.
Figure 11:
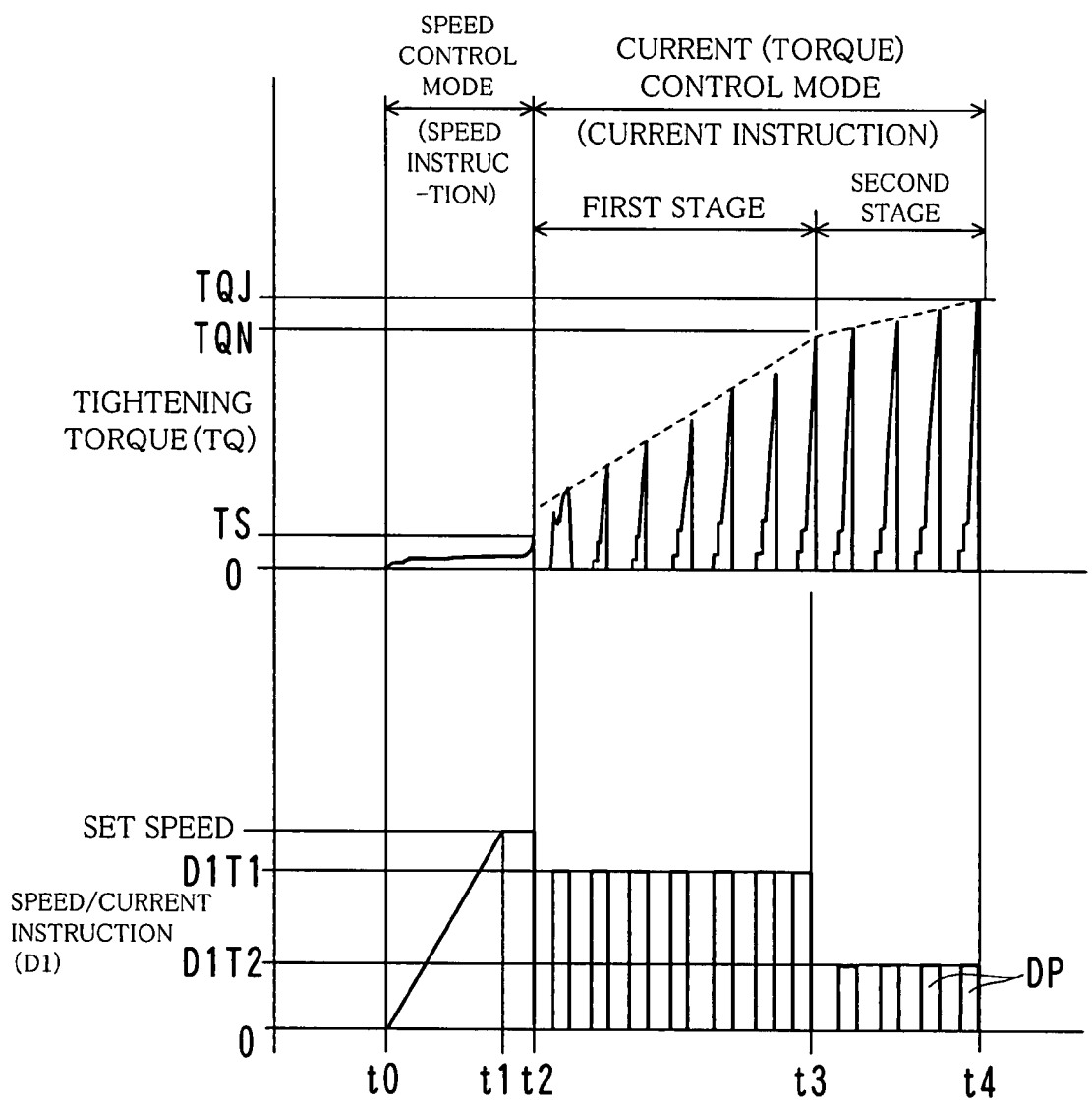
FIG. 11 is a diagram showing the torque two-stage control of the second embodiment.
Figure 12:
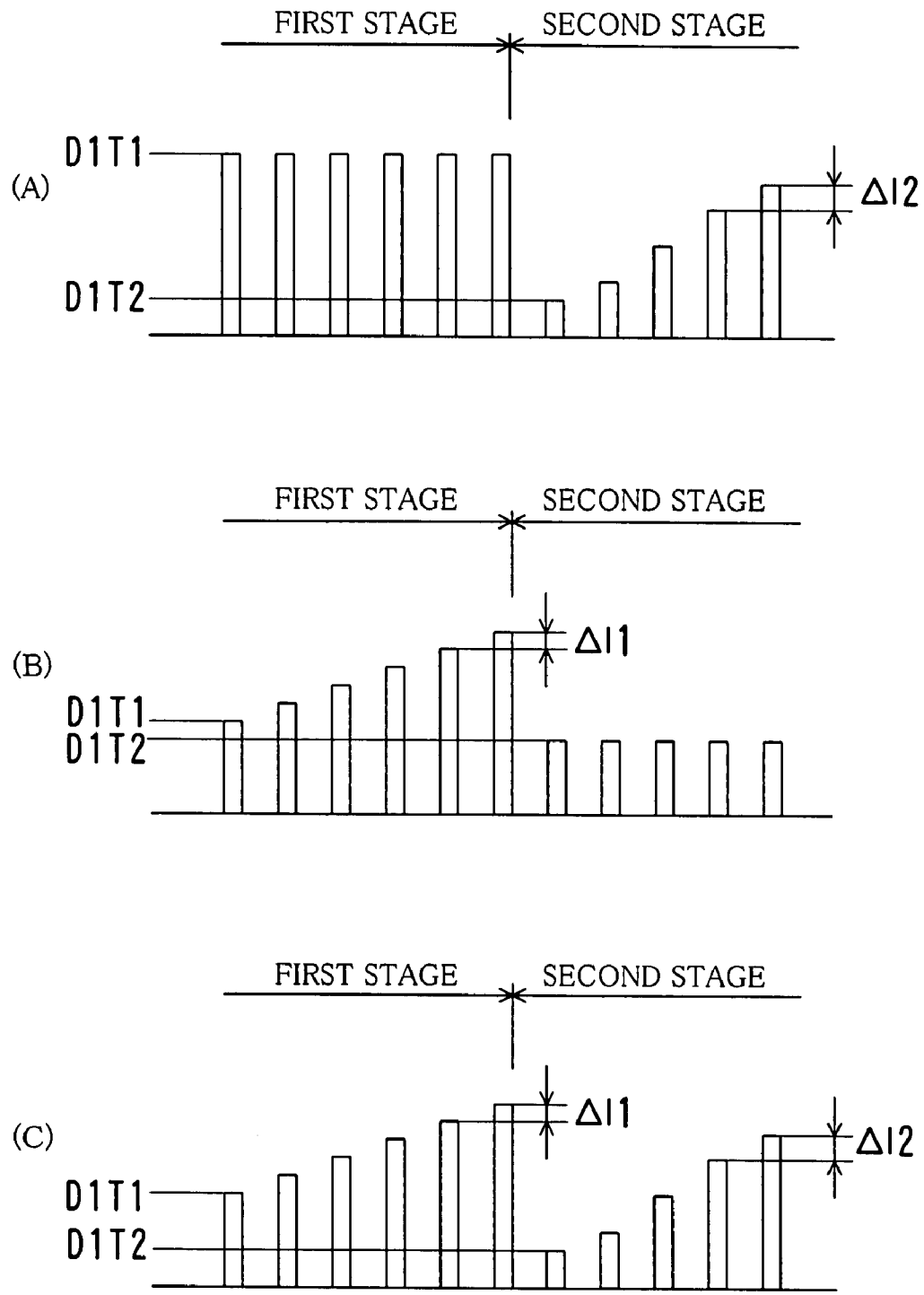
FIG. 12 is a diagram showing a variation of the torque two-stage control of the second embodiment.

FIG. 10 is a flowchart showing a routine of the torque two-stage control process according to the second embodiment of the present invention, and FIG. 11 is a diagram showing the torque two-stage control of the second embodiment. FIG. 12 is a diagram showing a variation of the torque two-stage control according to the second embodiment.

In FIG. 10, as for the torque two-stage control, if the tightening torque TQ has not reached the target approach torque TQN (No in #51), a current value of the current pulse DP is set to D1T1 (#52). After the tightening torque TQ reaches the target approach torque TQN (Yes in #51), a current value of the current pulse DP is set to a value D1T2 that is smaller than D1T1 (#53).

In other words, the control is performed in the current control mode so that current supplied to the motor 11 in the first stage becomes lower than that in the second stage as shown in FIG. 11. More specifically, a value of the current pulse DP (current value) defined by the current instruction data D1T is D1T1 that is constant in the first stage, while the current value is decreased from D1T1 to D1T2 in the second stage. When the tightening torque TQ reaches the target torque TQJ, the current instruction data D1T is set to zero.

Since the torque two-stage control is performed as described above, improvement of accuracy of the tightening torque and shortening of time necessary for fastening a screw can be realized similarly to the case of the first embodiment. Note that the values of the current values D1T1 and D1T2 can be set to various values.

In the second embodiment described above, a value of the current instruction data D1T is decreased so that current to be supplied to the motor 11 is decreased when the tightening torque TQ reaches the target approach torque TQN, but values of the current instruction data D1T in the first stage and the second stage are D1T1 and D1T2 respectively that are constant. However, it is possible to change a value of the current instruction data D1T in each stage. Concrete examples thereof will be described as below.

(1) As shown in FIG. 12(A), the current value D1T1 is made constant in the first stage. When the tightening torque TQ reaches the target approach torque TQN, the current value is decreased to D1T2. After that, the current value is increased by a predetermined increment ΔI2 every time of the current pulse DP during the second stage.

(2) As shown in FIG. 12(B), the current value is increased from D1T1 by a predetermined increment ΔI1 every time of the current pulse DP in the first stage. When the tightening torque TQ reaches the target approach torque TQN, the current value is decreased to D1T2. After that, the current value D1T2 is maintained constant during the second stage. In this case, the current values D1T1 and D1T2 may be the same value or different values.

(3) As shown in FIG. 12(C), the current value is increased from D1T1 by a predetermined increment ΔI1 every time of the current pulse DP in the first stage. When the tightening torque TQ reaches the target approach torque TQN, the current value is decreased to D1T2. After that, the current value is increased by a predetermined increment ΔI2 every time of the current pulse DP during the second stage.

In these variations, it is possible to set different values as the increments ΔI1 and ΔI2. In addition, the increments ΔI1 and ΔI2 may be the same value or different values.

Third Embodiment

Next, a third embodiment of the present invention will be described.

Figure 13:
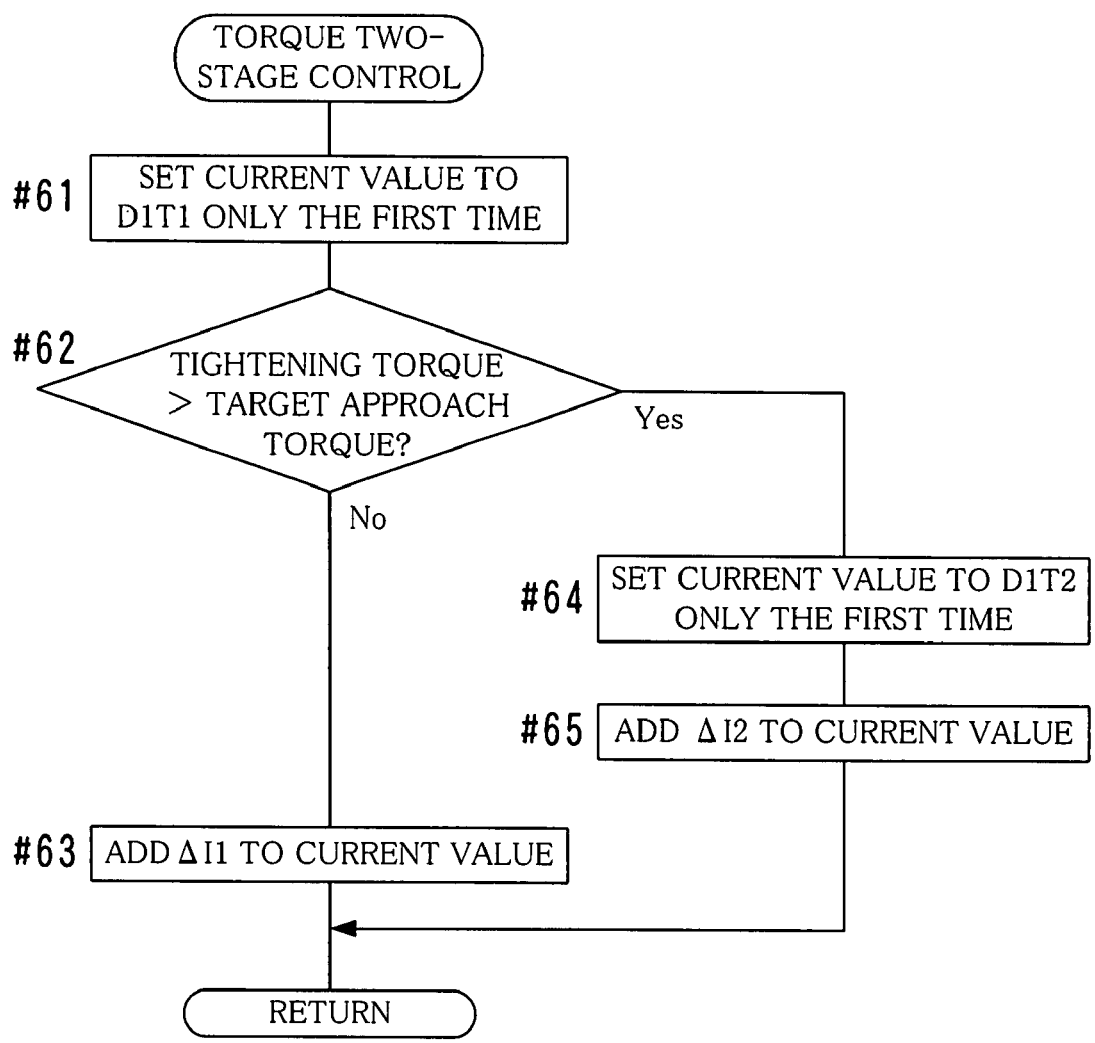
FIG. 13 is a flowchart showing the torque two-stage control process according to a third embodiment.

FIG. 13 is a flowchart showing a routine of the torque two-stage control process according to the third embodiment of the present invention.

In the third embodiment, the first embodiment and the second embodiment are combined. As shown in FIG. 13, in the first stage, the current value of the current pulse DP is set to D1T1 only the first time (#61). After that, if the tightening torque TQ has not reached the target approach torque TQN (No in #62), the increment ΔI1 is added to the current value (#63). After the tightening torque TQ reaches the target approach torque TQN (Yes in #62), the current value of the current pulse DP is set to D1T2 only the first time (#64). After that, the increment ΔI2 is added to the current value (#65). Note that the increment ΔI2 is a value smaller than the increment ΔI1.

More specifically, the third embodiment is a special case of the variation (3) of the second embodiment described above, which is the case where the increment ΔI2 is smaller than the increment ΔI1 in FIG. 12(C).

When the torque two-stage control is performed as described in the third embodiment, improvement of accuracy of the tightening torque and shortening of time necessary for fastening a screw can be realized similarly to the case of the first embodiment. Note that one of the first embodiment, the second embodiment, other variations, and the third embodiment may be adopted in accordance with a situation of the load including a type of the screw, a size of the same, a material and a state of a fastening member, and the like.

Note that the characteristic structure of the first embodiment corresponds to claims 2 and 10, the second embodiment corresponds to claims 4-7 and 11, and the third embodiment corresponds to claim 3, respectively.

In the embodiments described above, various sensors, circuits, devices, calculation methods or programs other than those described above can be used for detecting that the motor 11 has become the maximum rotation speed.

In addition, although the torque sensor 13 is used for detecting the tightening torque TQ in the embodiments described above, it is possible to determine the tightening torque TQ by calculation based on rotational speed of the motor 11 without using the torque sensor 13. In other words, if rotational speed of the motor 11 is known, the tightening torque TQ can be determined by calculation from a mechanical structure or the like of the screw fastening device main body 3. Such a calculation equation or a program may be stored in an appropriate memory, and the tightening torque TQ may be determined on real time every time when the rotational speed is detected. Furthermore, instead of calculation, a table or the like of a relationship between the rotational speed and the tightening torque TQ may be stored, and the tightening torque TQ may be read out from the table every time when the rotational speed is detected. Further in this case, an appropriate interpolation calculation may be performed with respect to the read data so as to determine a more correct value of the tightening torque TQ. In other words, the encoder 14, the speed detecting portion 32, the instruction control portion 44 or the like can be a torque detecting portion in this case. In addition, a sensor delivering an analogue signal proportional to the rotational speed or other sensor may be used for detecting the rotational speed of the motor 11.

In the embodiments described above, the structure or the shape of a whole or each part of the screw fastening device main body 3, the control unit 4 or the screw fastening device 1, the number thereof, the process contents, the process order or the like can be modified in accordance with the spirit of the present invention, if necessary.

In the embodiment described above, the instruction control portion 44 corresponds to the pulse driving portion and the pulse control portion of the present invention. The setting unit 45 corresponds to the setting portion of the present invention. In addition, the target approach torque TQN corresponds to the first set value, the target torque TQJ corresponds to the second set value, the first slope θ1 corresponds to the first increment, the second slope θ2 corresponds to the second increment, the increment ΔI1 corresponds to the first increment, and the increment ΔI2 corresponds to the second increment.

The present invention can be used for screw fastening work in an assembling line of automobiles, automation machines, and other various kinds of apparatuses.

The invention claimed is:

1. A control method for an impact type screw fastening device using an electric motor as a rotation driving source, the control method comprising the steps of:
   driving the motor to rotate by supplying thereto pulse current having a rectangular waveform with a flat peak and a predetermined period so that a speed of the motor becomes an intermittent waveform corresponding to the pulse current in a time axis and, at the same time, torque exerted on a load by rotation of the motor becomes pulse torque corresponding to the pulse current and increases pulse by pulse in succession in the time axis;
   in a first stage until the pulse torque reaches a first set value, controlling the pulse current so that the pulse torque increases pulse by pulse in succession in increments of a first torque value; and
   in a second stage starting from when the pulse torque reaches the first set value and until the pulse torque reaches a second set value, controlling the pulse current so that the pulse torque increases pulse by pulse in succession in increments of a second torque value that is smaller than the first torque value.

2. The control method for the impact type screw fastening device according to claim 1,
   wherein, in the first stage, the pulse current is controlled in such a way that a value thereof increases, pulse by pulse, in succession in increments of a first current value, and
   in the second stage, the pulse current is controlled in such a way that the value thereof increases, pulse by pulse, in succession in increments of a second current value that is smaller than the first current value.

3. The control method for the impact type screw fastening device according to claim 2, wherein supply of the pulse current to the motor is stopped when the pulse torque exerted on the load by rotation of the motor reaches the second set value.

4. The control method for the impact type screw fastening device according to claim 1,
   wherein, when the torque pulse reaches the first set value, the pulse current is controlled in such way that a value thereof is temporarily made smaller.

5. The control method for the impact type screw fastening device according to claim 4, wherein supply of the pulse current to the motor is stopped when the pulse torque exerted on the load by rotation of the motor reaches the second set value.

6. The control method for the impact type screw fastening device according to claim 1,
   wherein in the first stage, the pulse current is controlled in such a way that a value thereof, pulse by pulse, lies on a first slope,
   when the pulse torque reaches the first set value, the pulse current is controlled in such a way that the value thereof is temporarily made smaller, and
   in the second stage, the pulse current is controlled in such a way that the value thereof, pulse by pulse, lies on a second slope that is different from the first slope.

7. The control method for the impact type screw fastening device according to claim 6, wherein an angle of inclination of the second slope is set to a value smaller than that of the first slope.

8. The control method for the impact type screw fastening device according to claim 7, wherein supply of the pulse current to the motor is stopped when the pulse torque exerted on the load by rotation of the motor reaches the second set value.

9. The control method for the impact type screw fastening device according to claim 6, wherein supply of the pulse current to the motor is stopped when the pulse torque exerted on the load by rotation of the motor reaches the second set value.

10. The control method for the impact type screw fastening device according to claim 1,
    wherein, in the first stage, the pulse current is controlled in such a way that a value thereof, pulse by pulse, is made constant,
    when the pulse torque reaches the first set value, the pulse current is controlled in such a way that the value thereof is temporarily made smaller, and
    in the second stage, the pulse current is controlled in such a way that the value thereof increases, pulse by pulse, in succession in increments of a second current value that is smaller than the first current value.

11. The control method for the impact type screw fastening device according to claim 10, wherein supply of the pulse current to the motor is stopped when the pulse torque exerted on the load by rotation of the motor reaches the second set value.

12. The control method for the impact type screw fastening device according to claim 1,
wherein supply of the pulse current to the motor is stopped when the pulse torque exerted on the load by rotation of the motor reaches the second set value.

13. A control unit for an impact type screw fastening device using an electric motor as a rotation driving source, the control unit comprising:
a pulse driving portion that drives the motor to rotate by supplying thereto pulse current having a rectangular waveform with a flat peak and a predetermined period so that a speed of the motor becomes an intermittent waveform corresponding to the pulse current in a time axis and, at the same time, torque exerted on a load by rotation of the motor becomes pulse torque corresponding to the pulse current and increases pulse by pulse in succession in the time axis; and
a pulse control portion that controls the pulse current, in a first stage until the pulse torque reaches a first set value, so that the pulse torque increases pulse by pulse in succession in increments of a first torque value, and controls the pulse current, in a second stage starting from when the pulse torque reaches the first set value and until the pulse torque reaches a second set value, so that the pulse torque increases pulse by pulse in succession in increments of a second torque value that is smaller than the first torque value.

14. The control unit for an impact type screw fastening device according to claim 13,
wherein the pulse control portion controls the pulse current so that a value of the pulse current increases, pulse by pulse, in succession in increments of a first current value in the first stage, and controls the pulse current so that the value thereof increases, pulse by pulse, in succession in increments of a second current value that is smaller than the first current value in the second stage.

15. The control unit for an impact type screw fastening device according to claim 13,
wherein the pulse control portion controls the pulse current so that a value of the pulse current, pulse by pulse, lies on a first slope in the first stage;
controls the pulse current so that the value thereof is temporarily made smaller when the pulse torque reaches the first set value, and
controls the pulse current so that the value thereof, pulse by pulse, lies on a second slope that is different from the first slope in the second stage.

16. A control unit for an impact type screw fastening device using an electric motor as a rotation driving source, the control unit comprising:
a torque detecting portion that detects tightening torque of a screw by the motor;
a setting portion that sets a first set value and a second set value with respect to the tightening torque;
a pulse driving portion that drives the motor to rotate by supplying thereto pulse current having a rectangular waveform with a flat peak and a predetermined period so that a speed of the motor becomes an intermittent waveform corresponding to the pulse current in a time axis and, at the same time, torque exerted on a load by rotation of the motor becomes pulse torque corresponding to the pulse current and increases pulse by pulse in succession in the time axis;
a pulse control portion that controls the pulse current, in a first stage until the pulse torque reaches a first set value so that the pulse torque increases pulse by pulse in succession in increments of a first torque value, and controls the pulse current, in a second stage starting from when the pulse torque reaches the first set value and until the pulse torque reaches a second set value, so that the pulse torque increases pulse by pulse in succession in increments of a second torque value that is smaller than the first torque value; and
a stop control portion that stops supply of the pulse current to the motor when the tightening torque reaches the second set value.

17. A screw fastening device comprising:
a screw fastening device main body that uses an electric motor as a rotation driving source;
a torque detecting portion that detects tightening torque of a screw by the motor;
a setting portion that sets a first set value and a second set value with respect to the tightening torque;
a pulse driving portion that drives the motor to rotate by supplying thereto pulse current having a rectangular waveform with a flat peak and a predetermined period so that a speed of the motor becomes an intermittent waveform corresponding to the pulse current in a time axis and, at the same time, torque exerted on a load by rotation of the motor becomes pulse torque corresponding to the pulse current and increases pulse by pulse in succession in the time axis;
a pulse control portion that controls the pulse current, in a first stage until the pulse torque reaches a first set value, so that the pulse torque increases pulse by pulse in succession in increments of a first torque value, and controls the pulse current, in a second stage starting from when the pulse torque reaches the first set value and until the pulse torque reaches a second set value, so that the pulse torque increases pulse by pulse in succession in increments of a second torque value that is smaller than the first torque value; and
a stop control portion that stops supply of the pulse current to the motor when the tightening torque reaches the second set value.

* * * * *